UNITED STATES PATENT OFFICE.

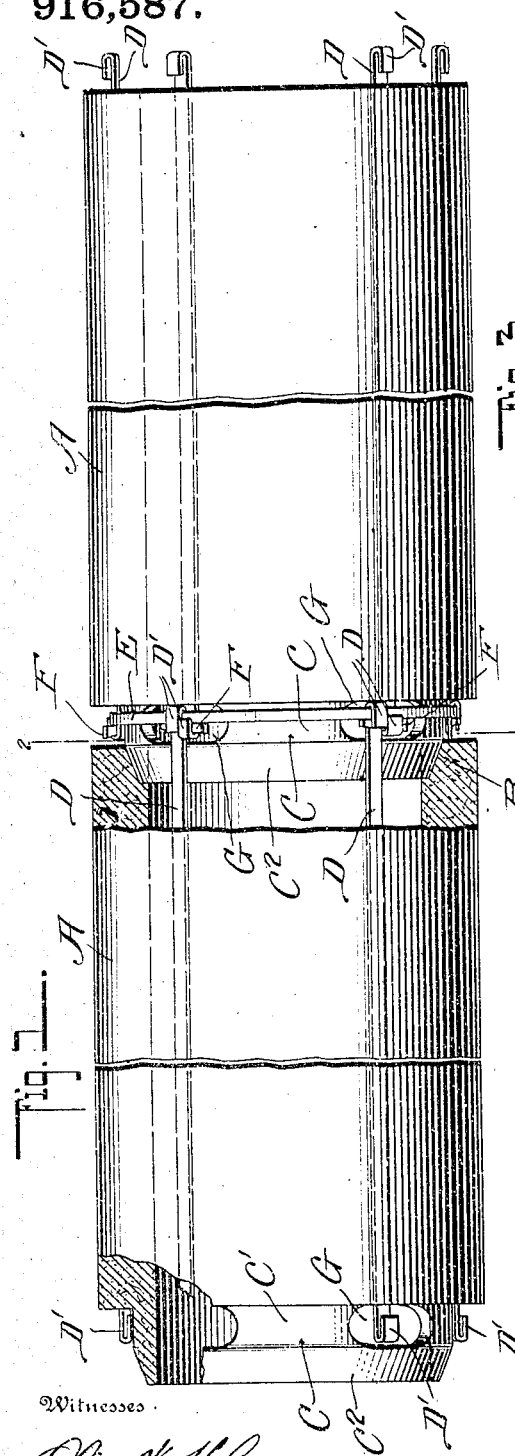

JOHN M. PHELAN, OF JACKSON, MICHIGAN, ASSIGNOR TO THE REINFORCED CONCRETE PIPE COMPANY, OF JACKSON, MICHIGAN, A CORPORATION OF OHIO.

REINFORCED-CONCRETE PIPE-COUPLING.

No. 916,587.          Specification of Letters Patent.          Patented March 30, 1909.

Application filed October 28, 1907. Serial No. 399,458.

*To all whom it may concern:*

Be it known that I, JOHN M. PHELAN, a citizen of the United States, residing at Jackson, in the county of Jackson and State of Michigan, have invented a new and useful Improvement in Reinforced-Concrete Pipe-Couplings, of which the following is a specification.

This invention relates generally to reinforced concrete pipe sections, and more particularly to the formation of the ends of the pipe sections, the object of the invention being to facilitate the coupling of the pipe sections together, and at the same time provide a simple, efficient and inexpensive construction of pipe which can be coupled from both the inside and outside.

With these objects in view my invention consists essentially in constructing one end of the reinforced pipe section with a collar which has openings opposite or adjacent one or more of the projecting and hooked reinforcing members, said collar being adapted to fit into the opposing end of the next adjacent section in such a manner that the hooked ends of the reinforcing members will be arranged oppositely disposed and in close proximity to each other for the purpose of receiving and holding the locking or tying band.

The invention consists also in certain details of construction, hereinafter fully described and pointed out in the claims.

In the drawing forming a part of this specification:—Figure 1 is a sectional elevation showing two sections of pipe coupled together. Fig. 2 is a transverse section on the line 2—2 of Fig. 1. Fig. 3 is a detail view showing in elevation one end of a modified form of construction.

Referring to the drawing A indicates the reinforced concrete pipe section, one end of which is cut away upon the interior as shown at B while the opposite end is formed with a collar C, the inner portion C' being straight while the outer portion is beveled as shown at C² and which is adapted to fit into the recessed portion B of the adjacent member as most clearly shown in Fig. 1.

D indicate the longitudinal reinforcing bars or members, the ends of which project beyond the pipe-section proper, as shown, but it will be noted that they do not project beyond the collar C. These bars or members D are bent back upon themselves as shown at D' providing hooks which are adapted to engage the tie-band E which is inserted between them when they are brought into close proximity, a wedge F being employed to lock the members and bands together. In order to enable this coupling operation to be performed from the inside of the conduit as well as the outside, I propose to make an opening G in the collar C as one or more points opposite the hooked end of the reinforcing member, and by having these openings so arranged, it is obvious that the introduction of the tie-band and the insertion of the wedge can be accomplished from the interior, thus greatly facilitating the work and producing a stronger, simpler and more economical construction of pipe-section.

It will be understood that after the bands and wedges have been inserted the openings are filled with cement and smoothed up, thereby making an unbroken joint.

By means of a pipe constructed as herein shown and described the lower part or that part within the trench can be coupled from the inside while the top portions can be coupled from the outside, if so desired.

In Fig. 1 I have shown the opening G as being formed in the straight portion of the collar, but it is obvious that this opening may extend entirely through the collar as shown at G' in Fig. 3.

In making the pipe sections the openings G or G' may be few in number and arranged only at points which are intended to go in the bottom of the trench, or these openings may be produced opposite each and every one of the reinforcing members, if desired.

Having thus fully described my invention, what I claim as new and desire to secure by Letters Patent is:—

1. A sewer pipe section having a collar at one end, reinforcing members extending longitudinally through the pipe section with projecting ends of said reinforcing members being hooked, the collar of the pipe section having openings opposite the projecting hooked ends of the reinforcing members.

2. A pipe section having longitudinal reinforcing members, the ends of which are hooked and project beyond the ends of the pipe-section proper, one end of the pipe section being recessed upon the interior and the opposite end of the pipe section being provided with a collar, the outer portion of which is beveled, said collar having an opening opposite the projecting end of each reinforcing member, for the purpose set forth.

3. A sewer pipe section having longitudinal reinforcing members, the projecting ends of which are hooked, one end of the pipe section being recessed upon the interior, the opposite end of the pipe section having a collar formed thereon, the outer portion of said collar being tapered, the inner portion of said collar having an opening therein opposite the projecting hooked end of each reinforcing member.

4. The combination with a pipe section having longitudinal reinforcing members, the ends of which are bent back upon themselves, of tie-bands and wedges, one end of the pipe section being recessed upon the interior, the opposing end of the pipe section having a collar formed thereon, the outer portion of said collar being tapered to fit into the recessed end of an opposing pipe section, said collar having openings produced therein opposite the projecting hooked ends of the reinforcing members, for the purpose specified.

JOHN M. PHELAN.

Witnesses:
PETER B. LOOMIS,
CHARLES G. ISMON.